United States Patent [19]

Bond et al.

[11] 4,355,574

[45] Oct. 26, 1982

[54] CAN PRESS IMPLEMENT FOR CANNED FOOD PRODUCTS

[76] Inventors: James M. Bond, 106 W. Church St.; Robert P. Dail, P.O. Box 426, both of Edenton, N.C. 27932

[21] Appl. No.: 248,025

[22] Filed: Mar. 26, 1981

[51] Int. Cl.³ .............................................. B30B 7/00
[52] U.S. Cl. .................................. 100/234; 100/110; 100/116; 100/295; D7/105; D8/52; 294/16
[58] Field of Search ............... 100/234, 243, 295, 102, 100/116, 104, 125, 110; 294/12, 16, 28, 29, 32, 6, 8.5; D7/99, 105; D8/52

[56] References Cited

U.S. PATENT DOCUMENTS

| | | | |
|---|---|---|---|
| D. 196,726 | 10/1963 | Bull | D8/52 X |
| D. 244,118 | 4/1977 | Dick | D7/99 |
| 2,399,834 | 5/1946 | Seltzer | 100/234 X |
| 2,433,815 | 12/1947 | LaForge | |
| 2,484,461 | 10/1949 | Perry | 100/102 X |
| 2,718,054 | 9/1955 | Pollack et al. | D8/39 UX |
| 2,887,948 | 5/1959 | Kramer et al. | |
| 3,292,963 | 12/1966 | Materyn | |
| 3,995,544 | 12/1976 | Farley | 100/116 |

Primary Examiner—Billy J. Wilhite
Attorney, Agent, or Firm—Munson H. Lane, Jr.

[57] ABSTRACT

A liquid-expressing tong-like implement for removing liquid from a can of food product containing solid food product immersed in liquid formed as a pair of scissor-like elongated arms pivoted together and having a finger loop formation at handle-forming rear end portions thereof and front end portions at the ends opposite said finger loop formations providing loop-shaped jaw formations. One of the jaw formation loops has a generally straight rod-like front leg portion extending transversely of its associated elongated arm, and a flat platen member sized to fit into an opened food product can to exert pressing forces onto the solid food product is pivotally coupled to the rod-like leg portion for pivotal movement about that transversely arranged leg portion. The other of the jaw formation loops defines a flat portion to engage the bottom of the opened can.

10 Claims, 5 Drawing Figures

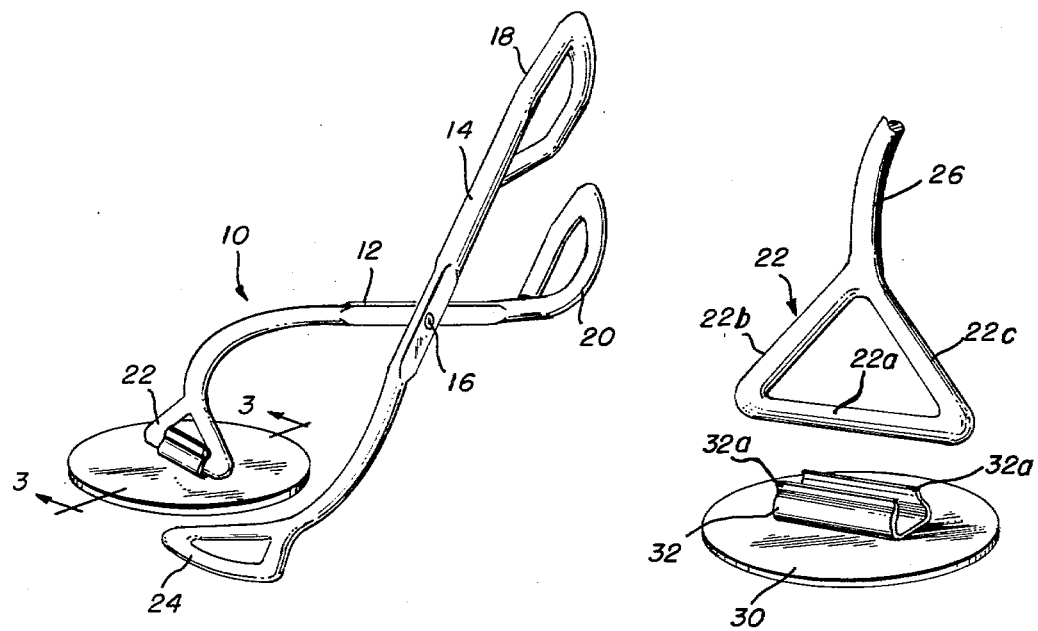
FIG. 1  FIG. 2
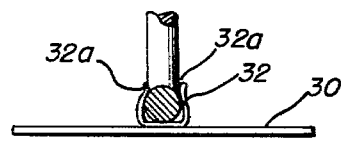
FIG. 3
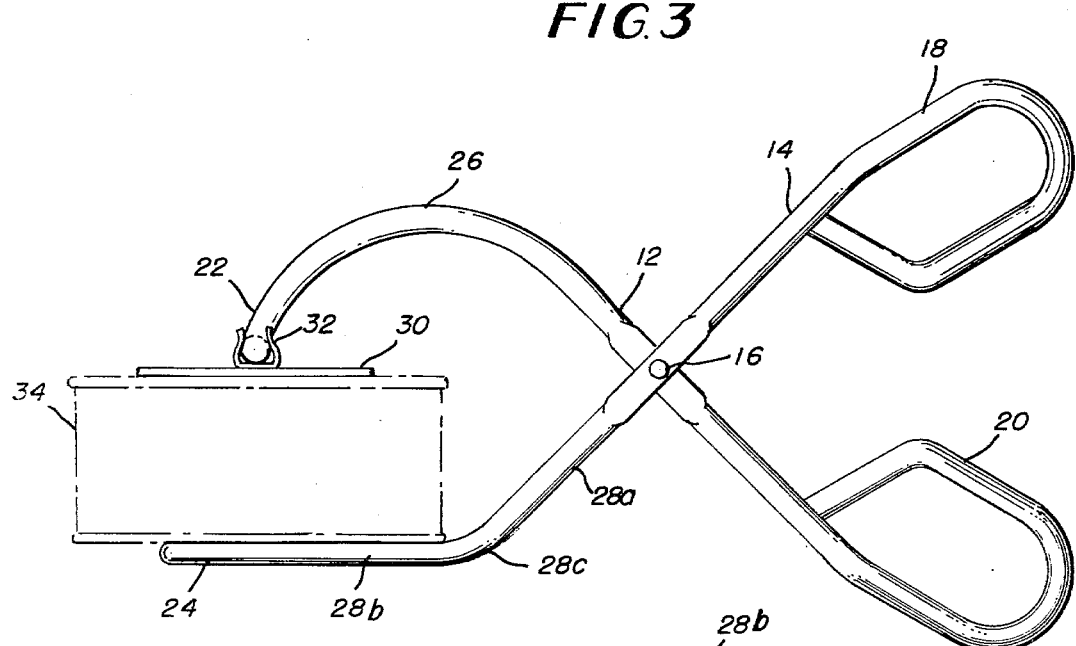
FIG. 4
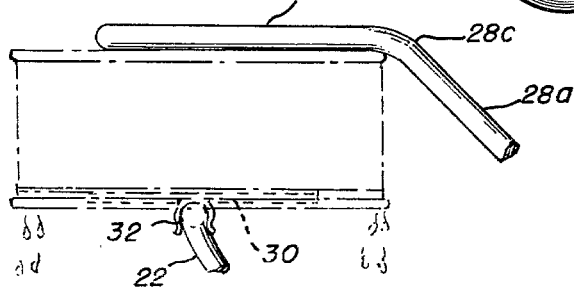
FIG. 5

CAN PRESS IMPLEMENT FOR CANNED FOOD PRODUCTS

BACKGROUND AND OBJECTS OF THE INVENTION

The present invention relates in general to canned goods press instruments or utensils for pressing liquid from canned food products, and more particularly to tong or scissors type utensils for pressing liquid from cans of solid food product, particularly sea food such as canned tuna fish, shrimp, oysters and the like for expressing liquid from the solid food product in the can.

It is well known that many solid food products such as meats, fish such as tuna, salmon and the like, canned sea food such as canned shrimps, oysters, and similar products, are canned with a relatively high content of liquid, such as oil, water in some instances, or the like. It is frequently desirable or necessary to separate or express in some manner this liquid from the solid food product in connection with food preparation or to facilitate extraction of the solid food product from the can. Most frequently, this is achieved by cutting the lid from the can and holding the cut lid against the can contents while the can is inverted to allow the liquid to drain from the can while retaining the solid food content in the can. This procedure involves some hazard because of the sharp edges of the cut lid and is offensive to many because of the mess associated with such procedure. Effects have been made to provide drainage utensils but they have not met with notable success, and have usually resulted in devices which are cumbersome and difficult to use and to maintain in sanitary condition.

An object of the present invention is the provision of a simple, inexpensive and compact device in the nature of scissors type tongs associated with a removeably attached flat circular platen which can be introduced into the top of an opened can of food product canned with liquid, such as fish or sea food with oil or water, and can be manipulated to readily invert the can for draining the liquid or juices from the can and to squeeze juices or liquid from the can.

Another object of the present invention in the provision of a novel scissors type pair of tongs serving as a can press implement of the type described in the immediately preceding paragraph, wherein the tongs have loop type jaw portions and the circular platen includes a resilient spring like channel-shaped catch for releasably assembling the platen to one of the loop shaped jaws of the tongs, and which can be removed from the tongs to enable the tongs to be used in the ordinary manner.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a can press tong implement constructed in accordance with the present invention;

FIG. 2 is a fragmentary perspective view of the circular platen with its channel-shaped spring catch and adjacent portions of one of the loop shaped jaws of the tong portion;

FIG. 3 is a fragmentary vertical section view of the platen and adjacent tong jaw portion, taken along the line 3—3 of FIG. 1;

FIG. 4 is a side elevation view of the can press tong implement in condition of use with the food product can indicated in broken lines therein; and FIG. 5 is a fragmentary elevation view similar to FIG. 4 but showing the can and tongs in inverted position with the platen pressing upwardly within the can.

DETAILED DESCRIPTION OF A PREFERRED EMBODIMENT

Referring to the drawings, wherein like reference characters designate corresponding parts throughout the several figures, the can press tongs or implement of the present invention is indicated generally by the reference character 10 and comprises a pair of scissor-like elongated arms 12, 14 coupled together by a pivotal joint formed by a pivot member 16, such as a rivet or similar type fastner, extending through both of the elongated arms 12, 14 in the mid portion of the arms. The portions of the elongated arms 12, 14 extending in one direction from the pivot member or joint 16 terminate in handle portion 18, 20 formed in the illustrated embodiment by figure loop formulations similar to those customarily found on kitchen tongs. The portions of the elongated scissor arms 12, 14 extending in the opposite direction from the pivot joint 16 terminate in loop type jaw formations 22, 24, which form substantially triangular loops as more clearly illustrated in FIG. 2 having a substantially straight transversely extending side, as indicated at 22a forming the outer most edge or side of the loop type jaw, joined at its opposite ends to rearwardly converging inclinded sides 22b and 22c which at their apex join the shank of the associated scissor-like arm. In the illustrated embodiment, the shank portion, indicated by the reference character 26 of the scissor-like arm 12 forming the upper most loop type jaw 22, is shaped in side elevation to form an upwardly convex arched shank, while the corresponding portion of the other scissor-like arm 14 extending from the pivot joint 16 to the loop type jaw formation 24 is of angular configuration and side elevation providing a first straight section 28a extending from substantially its mid portion to the pivot joint 16 and an outer most straight section 28b extending from the tip or end of the lowermost loop type jaw 24 to the intermediate bend 28c.

The platen adapted to enter the food product can with which the implement is to be used to exert compression forces on the food product and press or squeeze the liquid from the food product is a flat circular thin platen 30, as particularly illustrated in FIGS. 2 and 3, of a diameter to enter into cans of customary sizes encountered in the market for such food products and has secured thereto an upwardly opening channel-shaped spring catch or coupling formation 32 forming an upwardly opening catch whose sides are bowed slightly, in the illustrated embodiment. These progress toward each other near their upper edges to define somewhat rounded lips or bead formation 32a providing an entrance throat of narrower width than the diameter of the straight transverse side 22a of the loop type jaw 22 to removeably receive the portion 22a of the loop type jaw 22 therein and frictionally restrain the circular platen 30 on the jaw formation 22 while permitting the platen 30 to pivot or rotate through a range of angles about the axis of the loop jaw portion 22a.

The above described implement is designed to press most of the liquid from a can of food product, such as a can of tuna fish, salmon, can shrimp, can oysters and the like in a particular convenient manner and will press all popular size cans of such products. In order to use the implement, the can of food product is opened in the usual manner by cutting the lid immediately inwardly of the top bead of the can and placing the can such as that illustrated in broken lines in FIGS. 4 and 5 and designated by the reference character 34, between the lower jaw loop formation 24 and the platen 30 with the lid of the can left in place. The lower jaw loop formation 24 and straight shank portion 28b is placed in contact with the bottom of the can extending underneath the can in the manner shown in FIG. 4, the implement with the can griped between the platen 30 and jaw 24 is inverted to the FIG. 5 position, and the finger loop handle formations 18, 20 are squeezed together causing pressure to be applied to the opened lid of the can and the base or bottom of the can, which presses most of the liquid out of the solid food product in the can. The implement with the associated can is then reinverted to the original position and the implement is withdrawn from the can, for subsequent removal of the food product from the can. It will be apparent that by providing the spring catch 32 for releasably securing the platen 30 from the jaw loop 22, the platen can be readily removed from assembled relation with the scissors-like arms, permitting the tongs to then be used in the normal manner as conventional kitchen tongs.

We claim:

1. A liquid-expressing tong-like implement for removing liquid from a can of food product containing solid food product immersed in liquid, comprising tongs formed of a pair of scissor-like elongated arms pivoted together at intermediate portions thereof, each arm having a finger loop formation at a handle-forming rear end portion thereof by which to manipulate the tongs, the arms having front end portions at the ends opposite said finger loop formations providing loop-shaped jaw formations, one of the jaw formation loops having a generally straight rod-like front leg portion extending transversely of its associated elongated arm, a flat platen member sized to fit into an opened food product can to exert pressing forces onto the solid food product and a coupling formation pivotally coupling the platen to said rod-like leg portion for pivotal movement about that transversely arranged leg portion, the other of said jaw formation loops having surfaces defining a flat portion to engage the bottom of the opened can whereby the food product may be compressed between said platen and the bottom of the can while the tongs hold the can to express the liquid therefrom.

2. A liquid-expressing tong-like implement as defined in claim 1, wherein the other of said jaw formation loops and its adjoining associated arm portion immediately adjacent that loop define a fine planiform surface for engaging the bottom of the opened can.

3. A liquid-expressing tong-like implement as defined in claim 2, wherein said coupling formation comprises a channel-shaped spring catch member having the base of the channel fixed to the platen and defining channel sides which converge toward each other upwardly from the platen to define an entrance throat there between of smaller width than said rod-like leg portion whereby the latter can be releaseably inserted into and withdrawn from the channel-shaped coupling formation leaving the tongs suitable for ordinary kitchen tong use when the platen is decoupled therefrom.

4. A liquid-expressing tong-like implement as defined in claim 2, wherein the portion of the elongated arm adjoining the first mentioned one of the jaw forming loops in the region extending from the pivotal coupling with the other arm to the first mentioned loop defining an upwardly arching curved arm portion in side elevation.

5. A liquid-expressing tong-like implement as defined in claim 1, wherein the portion of the scissor-like elongated arm joined to the other of said jaw formation loops is an angulated leg portion having an angular bend in the mid region thereof between the pivoted connection of said arms and the front end of its associated jaw formation loop and adjoining terminal arm portion to engage the flat bottom of the food product can.

6. A liquid-expressing tong-like implement as defined in claim 5, wherein said coupling formation comprises a channel-shaped spring catch member having the base of the channel fixed to the platen and defining channel sides which converge toward each other upwardly from the platen to define an entrance throat there between of smaller width than said rod-like leg portion whereby the latter can be releaseably inserted into and withdrawn from the channel-shaped coupling formation leaving the tongs suitable for ordinary kitchen tong use when the platen is decoupled therefrom.

7. A liquid-expressing tong-like implement as defined in claim 5, wherein the portion of the elongated arm adjoining the first mentioned one of the jaw forming loops in the region extending from the pivotal coupling with the other arm to the first mentioned loop defining an upwardly arching curved arm portion in side elevation.

8. A liquid-expressing tong-like implement as defined in claim 1, wherein said coupling formation comprises a channel-shaped spring catch member having the base of the channel fixed to the platen and defining channel sides which converge toward each other upwardly from the platen to define an entrance throat there between of smaller width than said rod-like leg portion whereby the latter can be releaseably inserted into and withdrawn from the channel-shaped coupling formation leaving the tongs suitable for ordinary kitchen tong use when the platen is decoupled therefrom.

9. A liquid-expressing tong-like implement as defined in claim 8, wherein the portion of the elongated arm adjoining the first mentioned one of the jaw forming loops in the region extending from the pivotal coupling with the other arm to the first mentioned loop defining an upwardly arching curved arm portion in side elevation.

10. A liquid-expressing tong-like implement as defined in claim 1, wherein the portion of the elongated arm adjoining the first mentioned one of the jaw forming loops in the region extending from the pivotal coupling with the other arm to the first mentioned loop defining an upwardly arching curved arm portion in side elevation.

* * * * *